J. L. BOYLE.
COMBINED TALKING AND PICTURE EXHIBITING MACHINE.
APPLICATION FILED DEC. 28, 1914.

1,313,214.

Patented Aug. 12, 1919.
8 SHEETS—SHEET 1.

Witnesses.
H. B. Davis
R. Connell.

Inventor;
John L. Boyle
by Argo & Harrison
atty

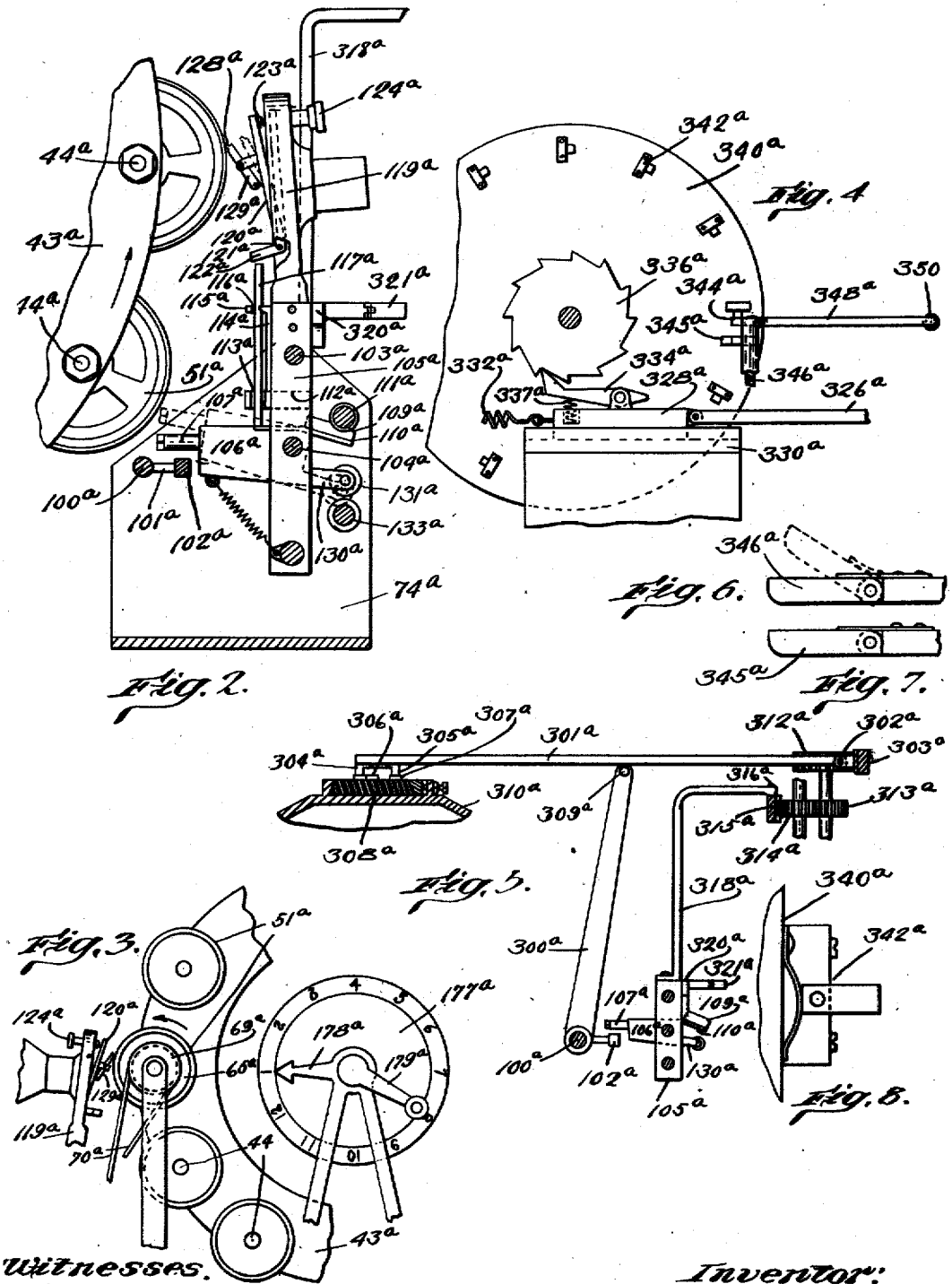

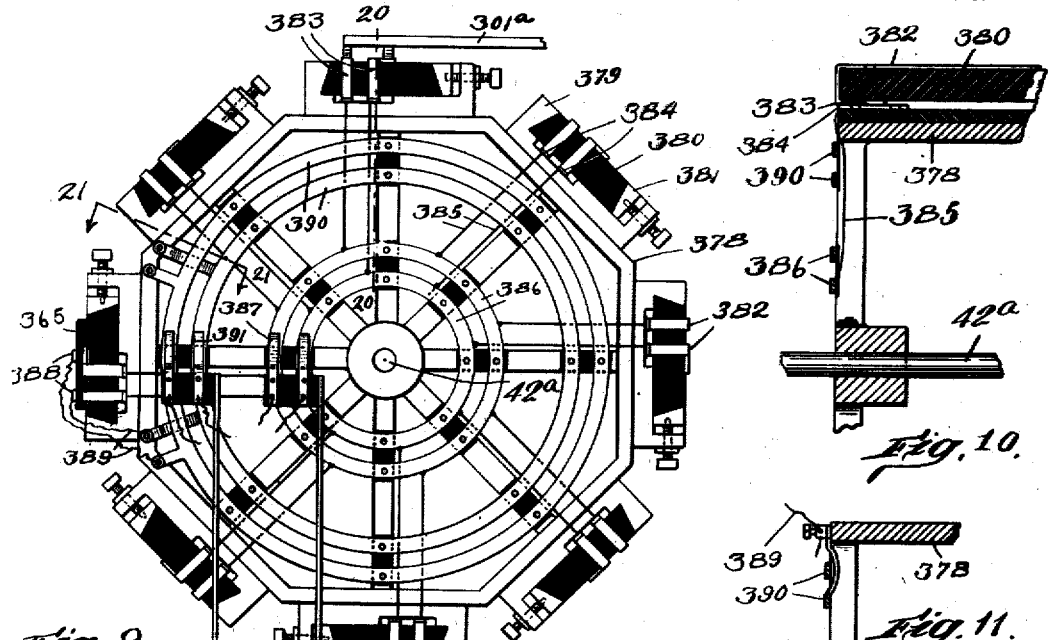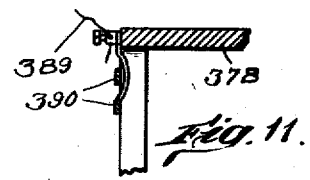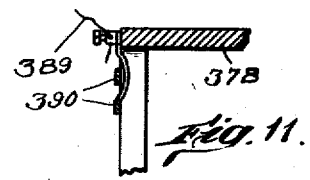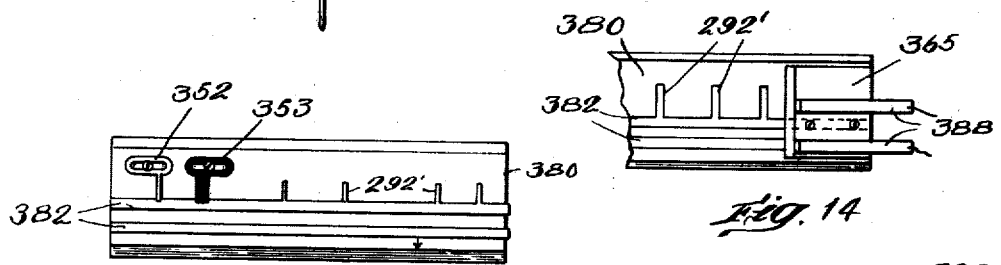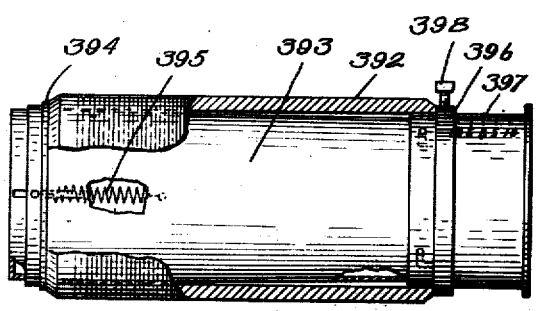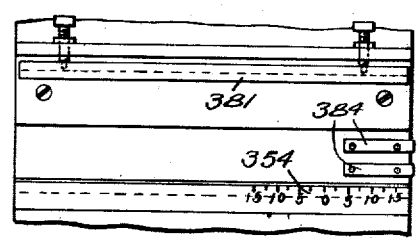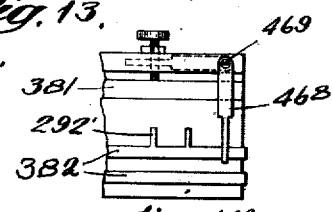

J. L. BOYLE.
COMBINED TALKING AND PICTURE EXHIBITING MACHINE.
APPLICATION FILED DEC. 28, 1914.
1,313,214.
Patented Aug. 12, 1919.
8 SHEETS—SHEET 4.
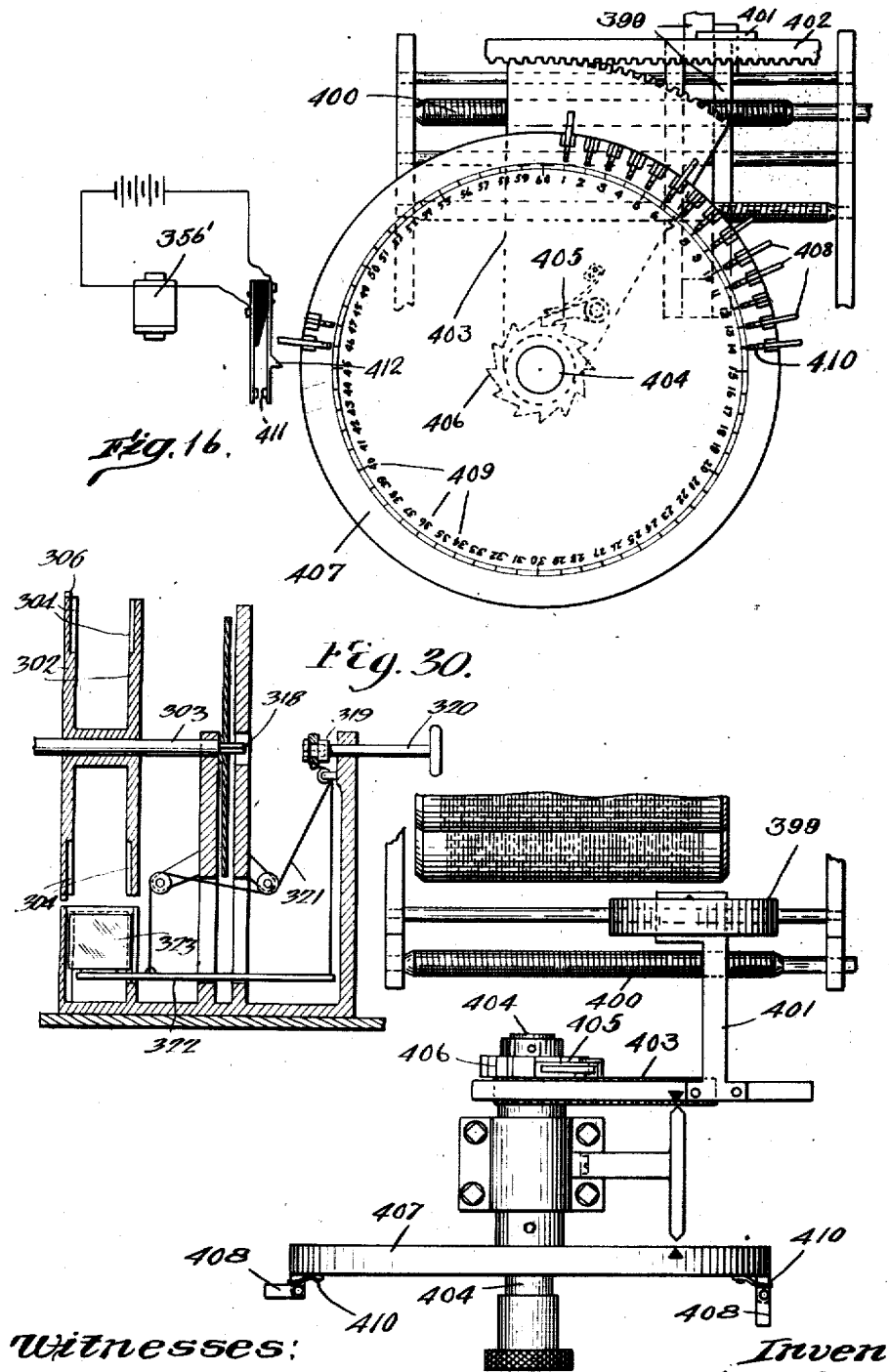
Witnesses:
H. B. Davis.
R. Connell.
Inventor:
John L. Boyle,
by Angus Harriman.
Attys.

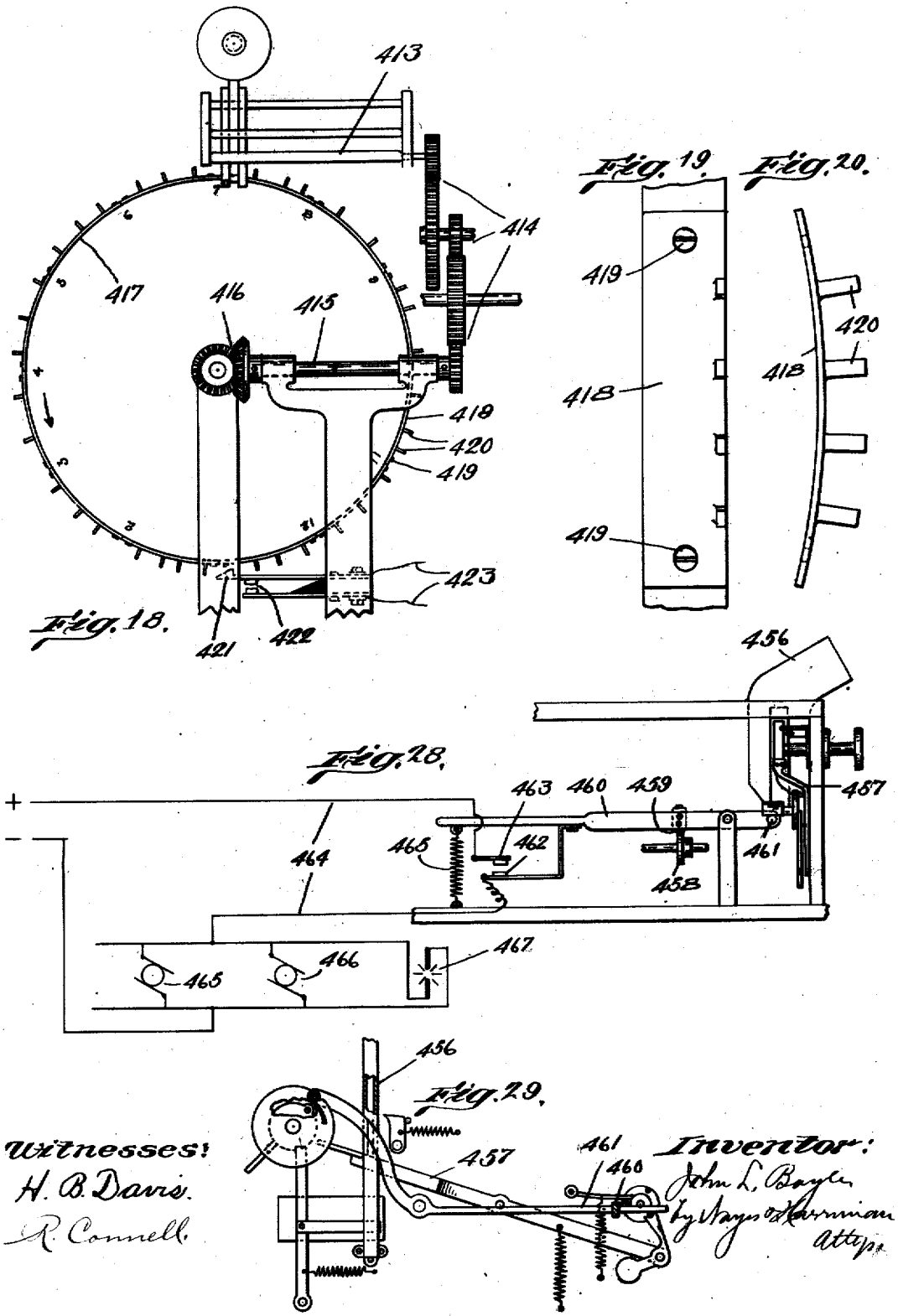

J. L. BOYLE.
COMBINED TALKING AND PICTURE EXHIBITING MACHINE.
APPLICATION FILED DEC. 28, 1914.

1,313,214.

Patented Aug. 12, 1919.
8 SHEETS—SHEET 6.

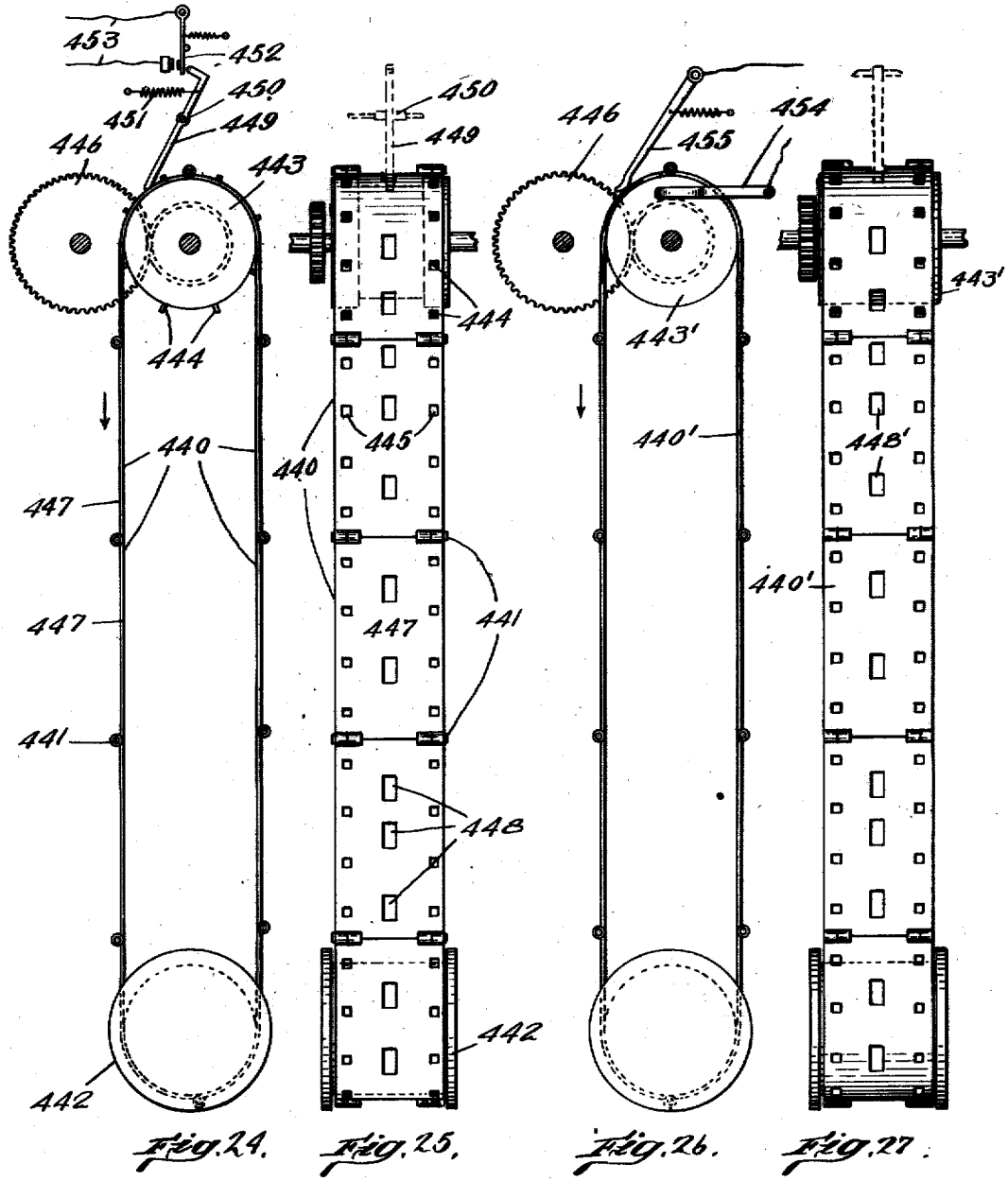

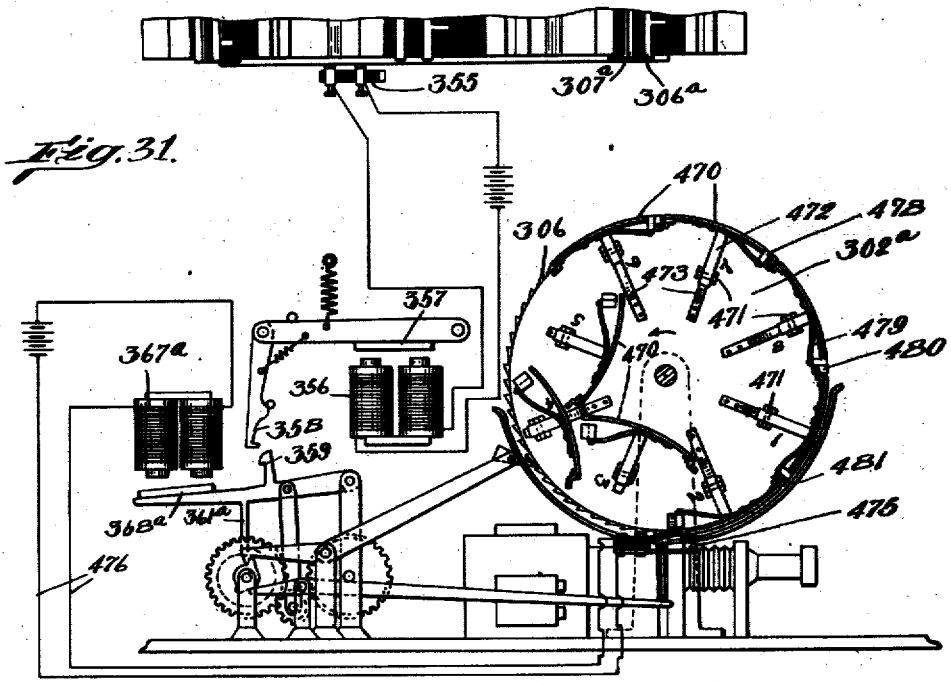
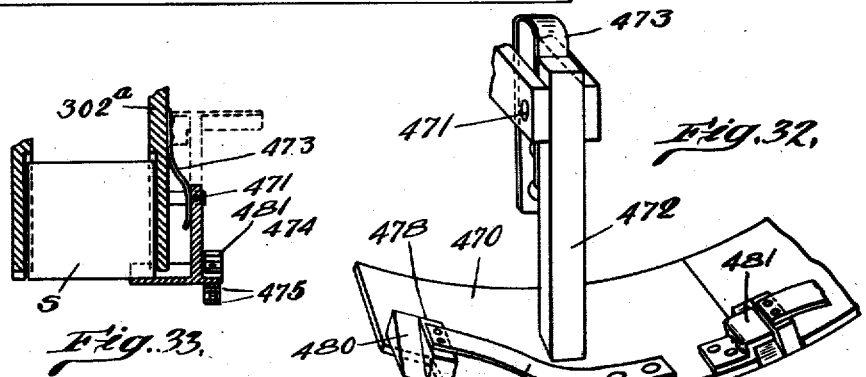
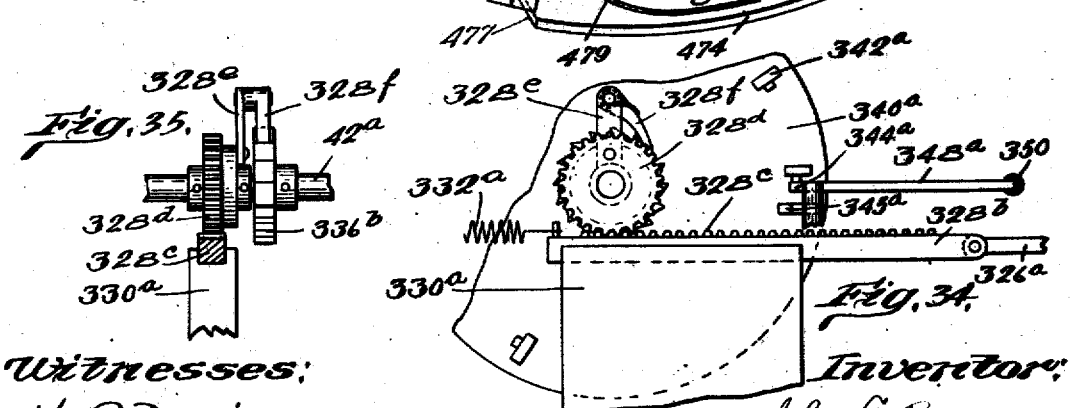

UNITED STATES PATENT OFFICE.

JOHN L. BOYLE, OF BOSTON, MASSACHUSETTS.

COMBINED TALKING AND PICTURE-EXHIBITING MACHINE 1,313,214.　　　　Specification of Letters Patent.　　Patented Aug. 12, 1919.

Application filed December 28, 1914. Serial No. 879,280.

*To all whom it may concern:*

Be it known that I, JOHN L. BOYLE, a citizen of the United States, residing at Boston, in the county of Suffolk and State of Massachusetts, have invented an Improvement in Combined Talking and Picture-Exhibiting Machines, of which the following is a specification.

This invention relates to a multiple record talking machine combined with a multiple picture exhibiting or projecting mechanism which may be of the stereopticon type, adapted for delivering a lecture, speech, or remarks of any kind which may be of considerable length, and exhibiting an extended series of appropriate pictures in properly timed relation to the several parts of the lecture or the like. A prime object of the invention is to provide an apparatus capable of handling a considerable number of talking machine records in automatic sequence, and controlling for exhibition in synchronism therewith a considerable number of pictures, the showing of which is automatically timed with reference to the delivery from the several records of the talking machine; this combination permitting the machine to be charged or "loaded" for automatic delivery with an extended range and volume of matter without requiring anything to be repeated both as to oral delivery and picture exhibition, thus especially adapting the machine for advertising, instructing, and entertaining purposes, etc. A further object of the invention is to provide a series of automatically operated controlling devices for a picture exhibiting machine adapted to be moved successively into and out of operative position. A further object is to provide means consisting in suitable indicators, whereby the talking machine records and the automatic controlling devices for the stereopticon or other picture exhibiting apparatus, may be correctly located with reference to each other on their respective supports so that the record and pictures will always coincide. A further object is to provide means whereby the controllers for the stereopticon and the talking machine records can be adjusted relative to each other. A further object is to provide means whereby a contact brush coöperative with the stereopticon controllers may be moved in timed relation with the talking machine reproducer but at an increased rate. A further object is to provide an automatic continuously operating mechanism which is preferably of a type adapted to permit indefinitely extended automatic operation by repeating the subject matter when the material with which the talking machine and stereopticon have been supplied has been once run through. A further object is to provide means for automatically readjusting the pictures and the talking machine while the apparatus is in operation. A further object is to provide means whereby the machine may be operated when either partly or entirely filled with records and pictures at will. A further object is to provide means permitting the playing and illustrating of selected single records. A further object is to provide a coin actuated means for starting the apparatus. A further object is to provide a combination of stereopticon controller member associated with a holder for a talking machine record. A further object is to provide one or more detachable adjustable controllers having locating means associated with a record holder. To suitably illustrate the invention particularly in its broader aspects I have shown the same herein embodied with a multiple record talking machine of the cylinder record type, although it is obvious that the invention, in principle, may be also embodied in a multiple record talking machine of the disk type. The talking machine of the cylinder record type as herein shown is generally similar to that exhibited in United States Patent No. 948,675. The multiple picture exhibiting machine or stereopticon is herein shown as generally similar to that of United States Patent No. 828,790. In each of these cases it is to be understood that the mechanism herein as to its operative details which it has in common with said patents is merely illustrative, and reference is made to the showing of said patents for further understanding of various details which it is deemed unnecessary to show herein. The foregoing and other objects and features of the invention will be better understood from the following detailed description taken in connection with the accompanying drawings and will be thereafter pointed out in the appended claims.

Referring to the drawings:

Fig. 2 is a view showing the means for carrying the reproducer, and the means for engaging the needle with and disengaging the same from a phonograph record;

Fig. 3 is a fragmentary right hand side elevation of the phonograph;

Fig. 4 is a fragmentary end elevation of the mechanism for rotating the record carrier;

Fig. 5 is a sectional elevation of the mechanism for actuating the contact arm which controls the stereopticon;

Figs. 6 and 7 are detail views of the arms for stopping the feeding movement of the record carrier;

Fig. 8 is a detail view of one of the stops on the record carrier;

Fig. 9 is an end view showing a slightly modified form of a controller drum;

Fig. 10 is a sectional detail on line 20—20 of Fig. 9;

Fig. 11 is a sectional detail on line 21—21 of Fig. 9;

Fig. 12 is an elevation showing the controller plate adapted to be fitted to the controller drum of Fig. 9;

Fig. 13 shows in elevation a fragmentary portion of the controller drum with the ways adapted to receive the controller plate;

Fig. 14 is a fragmentary elevation showing a special circuit controller member adapted to be fastened upon a controller plate.

Figure 1:
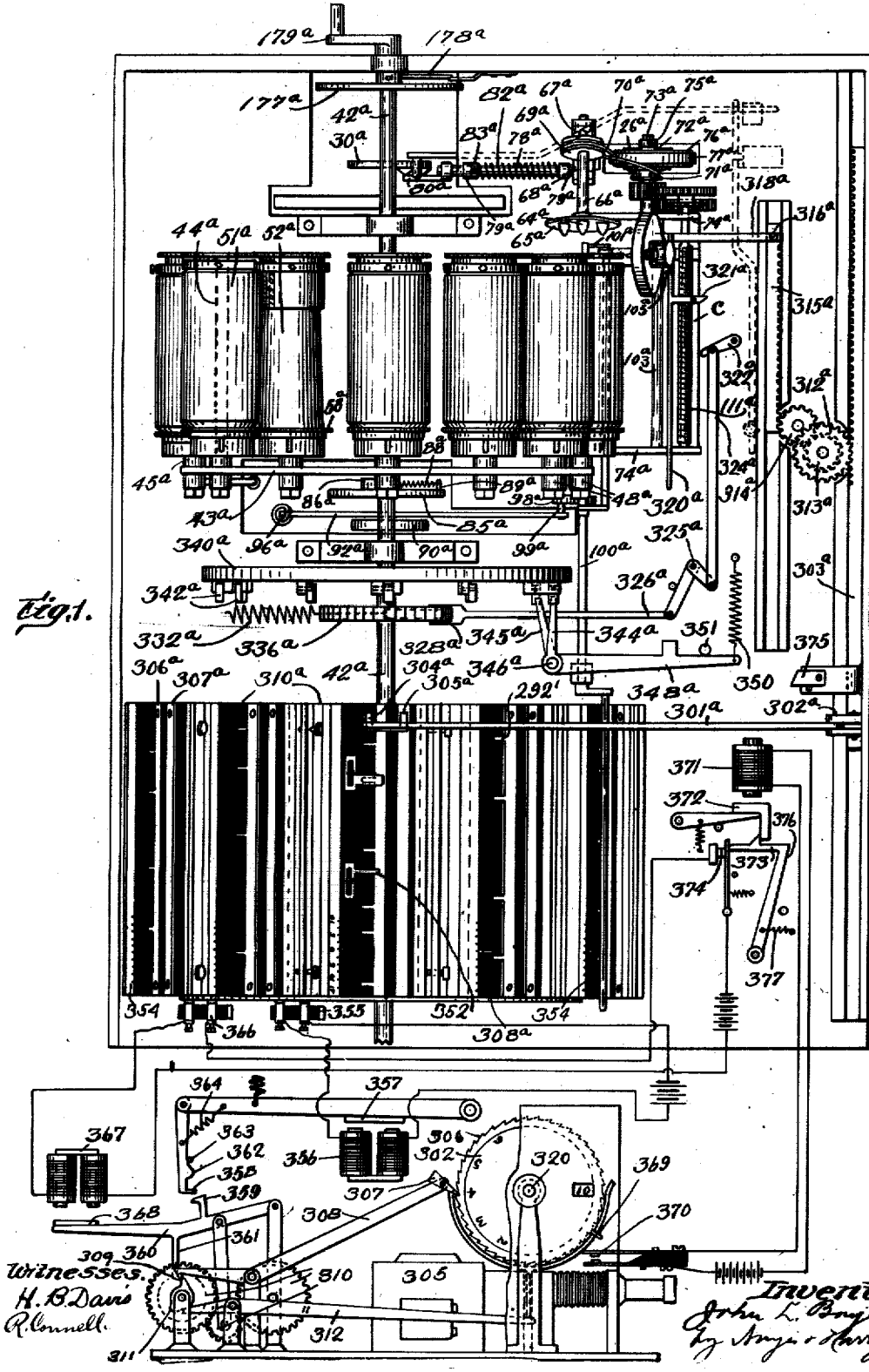
Figure 1 is a plan view of the cylinder type of phonograph and the controller for the stereopticon.
Figure 21:
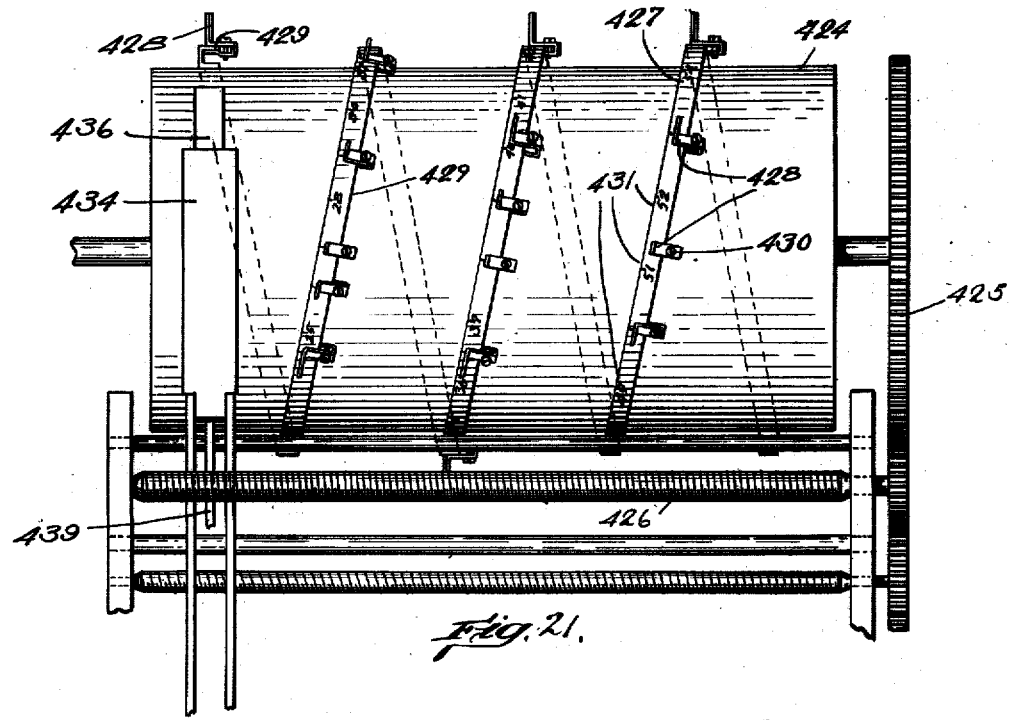
Figures 22, 23:
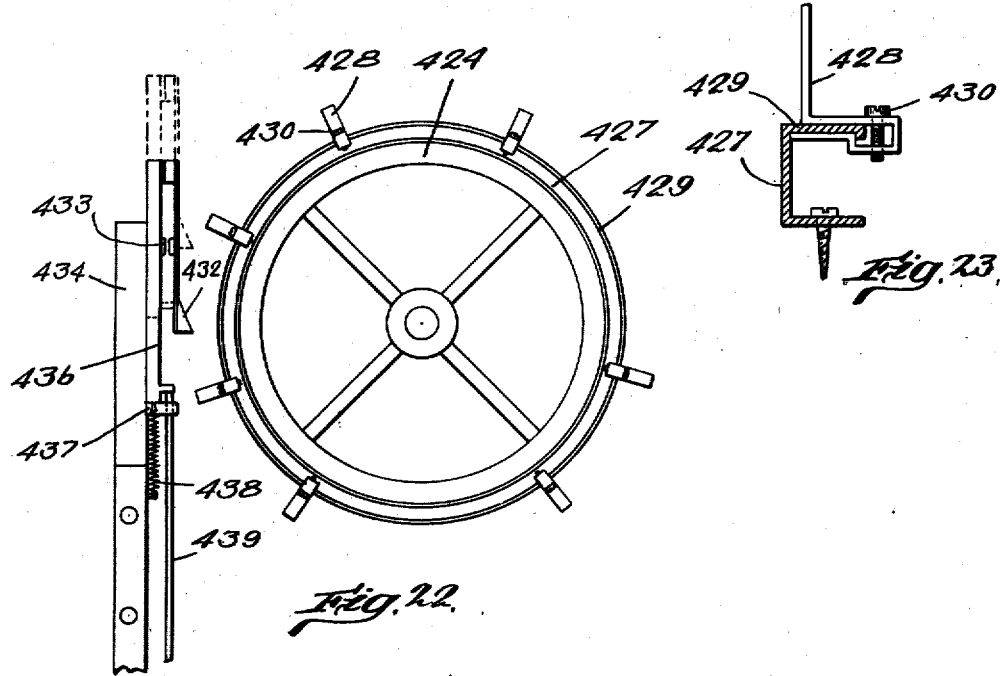

Fig. 14ª is a fragmentary elevation showing a modified form of controller device adapted for the selective playing of records and exhibition of picture slides to illustrate the same;

Fig. 15 is a view in elevation partly broken away in section of a cylinder record holder with provision for graduated endwise adjustment to bring it into synchronism with the stereopticon controller plates;

Fig. 16 is a fragmentary diagrammatic elevation showing one form of mechanically operated means for controlling the stereopticon circuit to keep it in timed relation with the operation of the talking machine;

Fig. 17 is a plan view of the mechanism shown in Fig. 16;

Fig. 18 is a diagrammatic elevation showing another form of mechanically operated means for controlling the movement of the stereopticon;

Figs. 19 and 20 show in front and edge elevation respectively a controller plate adapted for use with the mechanism in Fig. 18;

Fig. 21 shows in front elevation still another form of mechanical controlling means operated by the talking machine for governing operation of the stereopticon;

Fig. 22 is an end view showing the mechanism of Fig. 21 with parts omitted;

Fig. 23 is an enlarged sectional detail showing the manner of fastening the operating fingers to the drum of Fig. 22;

Figs. 24 and 25 show in side and front elevation respectively still another form of means for controlling the operation of the stereopticon to keep it in timed relation with the phonograph;

Figs. 26 and 27 show in side and front elevation a modification of the mechanism of Fig. 25;

Fig. 28 is a diagrammatic elevation showing a coin controlled means for setting the stereopticon and the phonograph simultaneously in operation;

Fig. 29 is a similar side elevation showing the operating parts of Fig. 28;

Fig. 30 is a central vertical section through the stereopticon drum showing a hand operating means therefor.

Fig. 31 is a side elevation showing a modified form of stereopticon adapted for the selective exhibition of pictures, a fragmentary portion of a controller therefor adapted to be connected to a talking machine being also shown;

Fig. 32 is a perspective showing parts associated with the stereopticon drum of Fig. 31;

Fig. 33 is a sectional detail further illustrating the stereopticon drum of Fig. 31;

Fig. 34 is an elevation partly broken away showing a modified form of mechanism for rotating the record carrier, being adapted to be used alternatively with the form shown in Fig. 4; and Fig. 35 is a transverse view in section and elevation of the operating mechanism shown in Fig. 34.

In applying my invention to the cylinder record type of talking machine, I preferably, though not necessarily, employ a machine of the type shown in Patent No. 948,675 as stated, to which reference is made for a more complete disclosure of the details of such talking machine. The talking machine of this type comprises a housing or casing having a main or driving shaft 42ª, and a record supporting plate 43ª. The plate 43ª is provided with a plurality of horizontally disposed shafts or rods 44ª, which are threaded into the plate 43ª near the edge thereof, and provided with a shoulder 45ª.

The horizontally disposed shafts or rods 44ª, preferably twelve in number, are each provided with a rotatably mounted phonographic record holder adapted to hold a record 51ª firmly in position thereon. The record holders 52ª are each provided with a movable ring 58ª having a flange adapted to engage the outer edge or surface of a record 51ª. The smaller ends of the record holders 52ª are provided with three openings each of which is adapted to receive a cone shaped lug 64ª secured to the inner face of a plate 65ª.

The plate 65ª is rigidly secured to the inner end of a shaft 66ª, which is journaled in the forked end 67ª of a vertically disposed arm 68ª. The shaft 66ª is also provided with a belt pulley 69ª over which is adapted to pass a crossed belt 70ª, which is adapted to run over the belt wheel 71ª secured to a sleeve 72ª, loosely mounted upon a shaft 73ª, and which in turn is rigidly secured to one of the upper end plates 74ª of a reproducer supporting frame C. The sleeve 72ª is held from slipping off the shaft 73ª by means of a collar 75ª, which is secured thereto by means of a set screw or the like. The sleeve 72ª is further provided with a second belt wheel 76ª, preferably integral with the belt wheel 71ª, over which runs the belt 77ª, which at its lower end is adapted to run over the belt wheel 26ª, which latter wheel 26ª is adapted to be rotated by a suitable motor. The vertically disposed arm 68ª is secured at its lowermost end to one end of horizontally disposed shaft 78ª journaled in the bearings or brackets 79ª. The opposite end of the shaft 78ª is provided with a depending arm 80ª, having its lower end adapted to engage and be actuated by means of a cam 30ª for automatically disengaging the plate 65ª from the end of the record holder 52ª after the record carried thereby has been played.

The shaft 78ª is rotated by means of a coiled spring 82ª and a horizontally adjustble collar 83ª, the object of the spring 82ª being to allow the center of the shaft 66ª to easily and readily adjust itself with the center of the record holders 52ª, owing to the fact that some of the record holders 52ª are apt at times to be out of alinement with the shaft 66ª, and unless the shaft could readily adjust itself the lugs 64ª of the plate 65ª could not enter the openings in the outer end of the record holders for revolving the same.

A wheel 85ª is provided on a shaft directly below the shaft 42ª, and said wheel has an arm 86ª pivotally connected to the inner face thereof. The lower end of the arm 86ª is connected with a coil spring 88ª, the opposite end of which is connected or secured to a pin 89ª. This spring 88ª normally holds the lower end of the arm 86ª in engagement with the shaft under the shaft 42ª. The upper end of the arm 86ª is adapted to engage one of the loosely mounted collars 48ª at each revolution of the wheel 85ª.

Secured adjacent to the outer face of the wheel 85ª is a cam 90ª, which is adapted to actuate an operating lever 92ª. The rear end of the lever 92ª is connected to a coil spring 96ª. The front end of the lever 92ª is connected to an arm 98ª by means of a link 99ª. The arm 98ª is secured to the projecting end of a rod or shaft 100ª journaled in the end plate 74ª of the reproducer supporting frame C. The shaft 100ª has connected with it by means of pins 101ª and running parallel therewith, a rod 102ª, which rod is suitably spaced from the shaft 100ª. The rod 102ª is adapted to actuate the reproducer supporting element about to be described.

Rigidly secured to the end plates 74ª of the frame C, is a pair of spaced supporting guide rods 103ª and 104ª located in vertical alinement. These rods pass through suitably spaced and vertically disposed bars 105ª adapted to act as a reproducer supporting carriage. Loosely mounted upon each rod 104ª between the two upright bars 105ª is a carriage 106ª having the rearwardly projecting pin 107ª upon which is rotatably mounted a collar which is adapted to engage a rod 102ª when the carriage block 106ª is in the dotted line position shown in Fig. 2. When the carriage block 106ª is in the position shown in full lines, the phonograph is in the act of playing a record, and it will be observed that the threaded plate 109ª, which is suitably secured to a spring arm 110ª carried by the block 106ª, is in engagement with the finely threaded rod 111ª journaled in the end plate 74ª of the frame C.

Rigidly secured between the carriage bars or arms 105ª and a suitable distance above the carriage block 106ª, is an arm 112ª having an opening 113ª therein. Integral with the arm 112ª and extending upwardly therefrom, is an arm 114ª having an outwardly projecting ear 115ª provided with an opening 116ª. Adapted to be loosely held within the openings 113ª, and 116ª, is a vertically disposed rod 117ª, which is adapted to rest upon the top of the carriage block 106ª.

Adjustably secured to the upper ends of the carriage bars or arms 105ª is the reproducer 119ª. The reproducer is provided with an arm 120ª pivoted at 121ª and having a right angular end 122ª, which is adapted to engage the rod 117ª. The upper end of the arm 120ª is connected to a coil spring 123ª held in a tubular member 124ª on the reproducer 119ª. The needle 128ª is secured to a pivotally mounted arm 129ª carried by the arm 120ª. With the parts shown the rod 117ª is adapted to engage the angular end 122ª of the arm 120ª causing said arm to automatically disengage the needle from the record 51ª immediately after the same has been played in order to allow the reproducer supporting carriage to travel to the starting point without allowing the needle to engage the record.

The carriage block 106ª is provided with an arm 130ª which carries a pivoted disk 131ª adapted to engage a worm shaft 133ª, which is the reverse of the shaft 111ª, when the threaded plate is in engagement with the threaded shaft 111ª. The threaded shaft 111ª is adapted to cause the reproducer carriage to travel to the right and the worm shaft 133ª is adapted to cause the same to travel toward the left.

A dial 177ª is secured to the shaft 42ª, and on one of the standards 40ª, a suitable pointer 178ª is provided. The end of the shaft is provided with a handle 179ª which enables a party to turn the record wheel D' in the direction to bring the numbers of the record which is desired to be played in alinement with the pointer 178ª.

Mounted upon the shaft 100ª, see Fig. 18, is an arm 300ª having a pin 309ª adapted to engage an arm 301ª, which is pivotally mounted at one end in a bracket 302ª, on a sliding rack 303ª. The other end of the arm 301ª is provided with a pair of bridging contact members 304ª, 305ª which are adapted to coöperate with contact blocks 306ª, 307ª mounted on blocks of insulation 308ª carried by a polygonal carrier 310ª on the shaft 42ª. The rack 303ª meshes with a gear 312ª, carrying a gear 313ª which meshes with a gear 314ª, and the latter meshes with a slidable rack 315ª. The rack 315ª has secured at 316ª one end of a rod 318ª.

The rod 318ª is connected to the reproducer holder 105ª and to the reproducer holder is also fastened a sliding bar 320ª having a finger 321ª. This finger is adapted to engage an arm 322ª, which is connected by a link 324ª to one end of a bell crank lever 325ª, the other arm of which lever is connected to a link rod or bar 326ª. The bar 326ª is connected at one end to a block 328ª which is slidably mounted in a groove formed in a support 330ª. A spring 332ª is connected to the block 328ª and tends normally to restore said block and the connected parts to their original position. A pawl 334ª is pivotally mounted on the block 328ª and is pressed into engagement with a ratchet wheel 336ª by a spring 337ª. When the rod 326ª is operated, the wheel 336ª is moved around step by step by the action of said pawl, and with it the disk 340ª which is also mounted on the shaft 42ª. To provide means whereby the record carrier of this multiple record "cylinder" talking machine may be turned as much as a complete revolution at once so that a single record may be automatically repeated if desired, I may provide in place of the described means for rotating the shaft 42ª and said carrier that shown in Figs. 34 and 35. In this form the bar 326ª is connected to move a slide block 328ᵇ which like the block 328ª is acted on by a tension spring 332ª. The block 328ᵇ has at its top a rack 328ᶜ engaging with a pinion 328ᵈ mounted to rotate on the shaft 42ª, and is held from endwise movement thereon. To this pinion is fixed a radial arm 328ᵉ which bears a pawl 328ᶠ engageable with a ratchet wheel 336ᵇ fixed on the shaft 42ª. In this form when the reproducer is returning to playing position at the starting of a record, the arm 326ª is moved out to set the spring 332ª under tension for turning the shaft 42ª as required. This is done as follows: As the arm 326ª is moved out, this moves the rack 328ᶜ drawing out the spring 332ª and placing it under tension. In this movement the pinion 328ᵈ and the pawl 328ᶠ are operated anti-clockwise as seen in Fig. 34, the pawl 328ᶠ slipping back over the teeth of the wheel 336ᵇ. Upon the termination of this outward movement of the arm 326ª and as the tension spring 332ª is at its maximum tension and is released as described, the pawl 328ᶠ will operatively engage the teeth of the wheel 336ᵇ exerting a turning force on the shaft 42ª, which will turn the record carrier a complete revolution unless sooner stopped by the stop mechanism described. A series of stops 342ª are mounted circumferentially on the disk 340ª, and they are adapted to coöperate with a pair of arms 344ª, 345ª carried by a shaft 346ª. This shaft is operated by an arm 348ª fast thereon, said arm being connected to a spring 350 by which it is held against a stop 351. The arm 348ª is moved by the end of the rod 320ª as the reproducer reaches the end of its movement on each cylinder. The arms 344ª, 345ª, coöperate alternately with the stops 342ª constituting an escapement device permitting the disk 340ª to move a prearranged distance each time the arm 348ª is swung as the playing of a record is completed.

As the connected bridging contact fingers 304ª, 305ª, are moved by their carrier arm 301ª over the contact strips 306ª, 307ª, the picture exhibiting mechanism is controlled in a manner hereinafter to be described, the contact strip 306ª having lateral contact portions 292' similar to the projections 292. In this form of the invention the gears 312ª, 314ª, serve to multiply the movement of the reproducer carriage in the traverse of the arm 301ª bearing the contacts 304ª, 305ª so that said contacts traverse the entire width of the contact strips as a result of the reciprocation of the reproducer carriage. At 352 I show a supplemental lateral contact piece adapted to be selectively applied to the contact strip 306ª to cause an auxiliary operation of the picture mechanism, while at 353 I show an insulating piece adapted to cover one of the lateral contact projections 292' and render it inoperative. At 354 a series of graduations on the contact carrying member are shown adapting said member to be adjusted endwise with reference to a fixed point on the drum so that the relation of the contact member with the rest of the apparatus and with the talking machine reproducer can be properly determined. The picture exhibiting mechanism chosen for illustrative purposes in connection with the described talking machine apparatus is, as before stated, similar to that of Patent No. 828,790, and reference is made to said patent for further disclosure of details thereof. This picture exhibiting mechanism comprises a rotatable drum 302 suitably journaled at 303 and having a multiplicity of spaced apart radial slide ways 304 to hold picture slides that are adapted to be projected downward when in lowermost position into the range of light projecting mechanism 305. This drum is equipped with a large ratchet wheel 306 engageable by a pivoted pawl 307 on the end of a lever 308 having at its other end a beak engageable by a cam 309 driven by a gearing 310 operated by a suitable motor (not shown) but adapted to create the constant tension and tendency to operate on said gearing. The gearing 310 also operates a projection 311 adapted to swing another lever 312 that is adapted to move the picture slided similarly described in said patent. I preferably provide means whereby the stereopticon slide magazine drum 302 may be operated by hand when desired and for this purpose I show its shaft 303 as equipped with a squared end 318 engageable by a wrench socket 319 at the end of a shaft 320 slidably fitted in the frame work and equipped with a handle. As the shaft 320 is slid lengthwise to cause its wrench socket 319 to engage the shaft end 318 a cord in connection 312 acting on a bar 322 is adapted to lift the picture slide 323 which may be then lowered out of the drum, back thereinto. The circuit from the contact strips 306ª, 307ª on the several insulating blocks 308ª is transmitted from suitable brush terminals 355 to a circuit including a magnet 356 which is adapted to act on an armature 357 on a vertically swinging arm which has pivoted at its outer end a catch 358 adapted to engage under a hook 359 on a lever arm 360 that has a depending stop member 361 adapted to control the movement of the stereopticon in causing a single operation thereof. The arm bearing catch 358 has thereon a hump 362 engageable by a pin 363 and held thereagainst by a spring 364. Thus as the magnet 356 is energized in the operation of the circuit controller connected with the talking machine, the catch 358 will be moved downward and engaged under the hook 359 lifting the stop arm 361; thereupon the hump 362 will swing the catch 358 out of engagement with the hook 359 and the stop 361 will again descend in position to permit only a single operation of the stereopticon. Instead of the regular contact strips with the spaced contact projections 292', I may employ at one or more contact stations on said controller a dummy 365 to be presently further described, and a second set of brush contacts 366 is arranged to complete the circuit when this dummy is engaged thereby. The brush terminals 366 lead to a circuit including a magnet 367 which is arranged to attract an armature 368 at the outer portion of the arm 360. Thus when such dummy reaches position to complete the circuit through the brush contacts 366, the magnet 367 will draw up the stop 361 and hold it up permitting the stereopticon to continue to move until it completes a prearranged portion of a cycle of movement. As this occurs a projection 369 turning with the stereopticon magazine drum presses together the contacts 370 that are normally spring held apart and this completes a circuit through a magnet 371 attracting an armature 372 and releasing a pivoted catch dog 373 permitting contacts 374 in the circuit of magnet 367 to separate, thereupon permitting the stop 361 to drop and stop the stereopticon. A purpose for this is to provide for the automatic resetting of the stereopticon at the end of a predetermined operative movement of the circuit controller drum connected with the talking machine, it being understood that the dummy member would ordinarily be inserted at the end of a given subject. Thus the apparatus can be used with any desired number of talking machine records, up to its full capacity, and when it is not working at its full capacity as the dummy at the end is encountered the stereopticon which will be filled to a degree corresponding to the talking machine, will also be automatically reset to starting position again. The extension 303ª of the rack bar which carries the brush arm 301 is also equipped with a pivoted dog 375 yieldable on the forward movement but adapted to engage on the return movement a rearward inclined portion 376 of the catch dog 373 to move it back against the action of its spring 377 to position where it will hold the contacts 374 together again thus resetting the parts as shown for further operation. In Figs. 9 to 13 I show in further detail and in slightly modified form the controller drum bearing the contact strips for governing the stereopticon. In this form the drum 378 itself has spaced apart thereon about its periphery the holders 379 for the insulating blocks 380 which bear the contact strips, these blocks being fitted to undercut grooves of said holders with followers 381 adjustable up from one side to clamp said blocks in place. The contact strips 382 are fixed to and extend across the outer sides of these insulating blocks and one end thereof is turned down around an end of the block underneath the same as seen at 383, these inturned ends underneath the blocks being held pressed against contact strips 384 extending in at the bottom of the recesses in holders 379 and connecting through leads 385 with contact rings 386 engaged by brushes 387 which are associated with the brush terminals 355 as described. The dummy 365 is adapted to be fastened to a controller member 380, at one end thereof and it has contact strips 388 connected by leads 389 with contact rings 390, these rings being engageable by contact brushes 391 associated with the contact terminals 366 described. In Fig. 15 I show means permitting limited adjustment of the cylinder record of the talking machine endwise to facilitate bringing the record and the stereopticon more exactly into register. For this purpose the record 392 is fitted on a holder 393 with a ring flange 394 drawn thereagainst at one end by a spring 395. At its other end the record is engaged by a ring flange 396 which is adjustable along the outer portion of the holder to a series of determinate points as indicated by the graduations 397. A set screw 398 is provided so that this ring may be set in any adjusted position. It will be understood that the spring 395 has a range of action adapted to press the ring 394 against one end of the record to hold it clamped against the ring 396 at its other end throughout the range of adjustment of said ring 396. This adjustment of the record may be used either by itself or in conjunction with the adjustment of the contact strips provided for by the graduations 354, and by this means the exhibition of pictures and the operation of the talking machine may be brought into close synchronism. In Figs. 16 and 17 I show a construction whereby the controller actuated by the talking machine for governing the circuit that controls the stereopticon is of a mechanical form. In this form the phonograph reproducer carriage indicated at 399 and fed by the screw 400 has an arm 401 bearing a rack 402 engageable with a gear segment formed on a swinging arm 403. The swinging arm 403 is journaled on a shaft axis 404 and bears a pivoted pawl 405 engageable with a ratchet wheel 406 having rigid therewith a disk plate 407 also journaled on the shaft 404. The disk plate 407 has pivotally fixed to one side thereof at spaced apart points about its circumference a series of contact fingers 408. A number of indexes as seen at 409 may be arranged adjacent the respective ones of these fingers so that they may be identified and selective ones thereof turned outward to operative position while others are turned inward to inoperative position, suitable springs 410 being arranged to hold these fingers either operative or inoperative as they may be set to coöperate with any particular talking machine record. The outwardly projecting ones of these fingers are adapted to press together contacts 411 that are normally spring held apart by engaging with a beveled beak 412 on one of said contacts; thus closing a circuit through a magnet 356' which may correspond with the magnet 356 of the previously described form. Thus as a given series of phonograph records are inserted in the talking machine, certain selective ones of the fingers 408 may be quickly adjusted outward to operative position, as indicated for proper illustration of the subject matter of said records by a corresponding series of pictures to be supplied to the stereopticon. In Figs. 18 to 20 I show another form of the invention wherein a mechanical form of controller for the stereopticon circuit is connected with the talking machine. In this case the reproducer feed screw of the talking machine is indicated at 413 and this, through suitable intermediate gearing 414, shaft 415, and miter gears 416 is connected to operate a drum 417. To the periphery of this drum are detachably fixed as by screws 419 a series of plates 418. Each of these plates bears a series of projections 420 adapted to engage with a beveled beak 421 of a spring contact member 422 and thus complete a circuit 423 which may control the stereopticon by passing through a magnet such as magnet 356. In this form of the invention it is contemplated that each of the plates 418 shall have operative projections 420 preferably corresponding in number and arrangement to the requirements for illustrating one talking machine record. Thus different plates 418 may be selectively employed on the controller drum, and readily changed as different series of talking machine records and series of pictures are to be handled by the machine. In Figs. 21 to 24 I show still another form where a mechanical form of controller is employed. In this form a drum 424 is connected by gearing 425 with the reproducer feed screw 426. On this drum is mounted a spiral flange 427 extending throughout its length and having bracket fingers 428 detachably clamped to a ledge 429 thereof as by screws 430. The spiral flanged rib 427 has indicator markings along the length thereof as seen at 431 and the projections 428 may be adjustably clamped along the extent of said spiral rib as indicated by said indicator marks to properly position them for coöperation with a given series of talking machine records. The projections 428 are engaged by a beveled head 432 on a spring arm to press together contacts 433 and complete a circuit which may govern the stereopticon as in the previously described forms. The head 432 and the contacts 433 are carried by an arm 434 which is connected to be fed along with the reproducer carriage and it will be understood that the pitch of the spiral 427 is made to correspond with this feed movement. I preferably provide means whereby the beveled head 432 may be lifted out of operative relation with the projections 428 and for this purpose it is carried directly by a slide plate 436 on the arm 434 which is normally held yieldingly downward against a stop 437 by a spring 438 but capable of being lifted to dotted line position as shown by rods 439, where it is out of the range of projections 428. In Figs. 24 and 25 I show a further modification of the controller mechanism wherein a belt 440 made up of a series of sections detachably jointed as seen at 441 passes around spaced apart drums 442, 443, the latter of these having sprocket pins 444 engaging sprocket recesses 445 at the sides of said belt. The drum 443 is driven by gearing 446 connected with the talking machine mechanism, being preferably geared to the reproducer screw. Each of the sections 447 of said belt has a series of perforations 448 therethrough varying in the different sections according to the phonograph record corresponding thereto, it being understood that the perforations in each of these belt sections is adapted to govern the showing of pictures for a particular phonograph record or selected part of a record. An arm 449 pivoted at 450 is held pressed against said belt by a spring 451 and in the line of the perforations 448. Whenever one of these perforations comes opposite said arm it is permitted to swing thereinto under the action of the spring 451 and this closes the contacts 452 in a circuit 453 which may control the stereopticon as before described. It will be understood that the belt 440, or sections thereof may be exchanged for other belts or belt sections at will as dictated by the requirements of the phonograph records and pictures to be exhibited therewith. In Figs. 26 and 27 I show a form similar to that just described except that the belt itself constitutes a part of the circuit controlling means. In this form a belt 440' is made of jointed sections like the belt 440 and is mounted and driven in a similar manner. This belt also has perforations 448' similar to the perforations 448. In this form the belt 440' is however made of insulating material and the drum 443' over which it passes has an electrical conductor connected with the circuit controlling the stereopticon by a brush 454. The other terminal of said circuit leads to a spring pressed contact finger 455 mounted in position to engage with the contact drum 443' by passing through the perforations 448' as they come opposite thereto, thus controlling the stereopticon circuit as in the previously described forms. In Figs. 28 and 29 I show means whereby a coin controlled device may be applied to the present apparatus. This construction may be generally similar to that shown in Patent No. 948,675 with a coin chute 456 permitting a coin to descend upon the lever 457 and through suitable manual operation as described in said patent to permit the starting of the motor. At 458 a brake wheel disk is indicated which is normally acted on by a brake block 459 carried on a swinging lever 460. As this lever is lifted by the action of the lever arm 461 in the operation of the mechanism to release the brake, it brings a contact 462 carried thereby into engagement with a coöperating contact 463 of a circuit 464, this action being against the tension of a spring 465 normally holding these contacts apart.

The closing of circuit 464 may supply energy to the motor 465 of the talking machine and to the motor 466 of the stereopticon, and also to the light 467 of the stereopticon.

In accordance with my invention special means may be provided whereby one or more of the eight records for which the cylinder type of machine as shown is adapted may be selected to be automatically played and illustrated successively without playing the others. Thus the machine may be loaded with a full quota of records and picture slides and only a selective number such as say four of the eight records may be played and automatically illustrated if desired, thus making the machine more adaptable to varied uses. For this purpose I mount on the controller holder 379 a metallic finger 468 as seen in Fig. 14ª, this being pivoted to the holder at 469 and adapted to be swung around to operative position adjacent the end of the controller to contact with the strip 382, and being capable of being swung back to inoperative position as seen in dotted lines. Referring to Figs. 31–33 the slide holding drum 302ª has pivoted thereto as seen at 471 a series of curved plate members 470 shown as eight in number corresponding to the number of records the talking machine is adapted to handle. The members 470 are formed as a series of arcuate plates carried by swinging arms 472 and these plates together extend entirely around the circumference of the slide holder drum dividing it into equal parts. These members are capable of being swung down to operative position where they engage the slides S to hold them from moving out of the drum and they may also be individually swung back out of operative position as seen in dotted lines in Fig. 33, being held in either position by a presser spring 473 engaging a flat surface thereof opposite the pivot 471. To permit the swinging back of most or all of the members 3 to inoperative position as described, the pivots 471 therefor are shown as staggered, i. e., at different distances from the center so that the several members when swung back will not overlap. The members 470 are equipped with rearward extensions 474 that are adapted to close a pair of normally open contacts 475 while such member 470 is passing the same. These contacts 475 are in a circuit 476 of magnet 367ᵃ and a closure of these contacts will therefore cause the attraction of the armature 368ᵃ lifting the stop member 361ᵃ and permitting the slide holder drum to be turned until such member 470 is out of operative range. It will be understood that the present arrangement is for use where an equal number of picture slides are provided to correspond with each record, i. e., if ten slides were provided for each record and the stereopticon were adapted to receive eighty slides, then each member 470 would cover and hold from exhibition ten slides when set in operative position.

If the machine is fitted with eight records and if four of these are selected for playing and illustration, e. g., numbers one, three, four and six, the first operation will be to adjust the number one record and the slides to illustrate the same; then as record number two is to be skipped, the finger 468 on the controller holder for record number one is set out in operative position and likewise the corresponding fingers on the controller holders for records number four and six. Since records number two, five, seven and eight are not to be played and hence the pictures for these records should be skipped automatically, this may be done by turning down into operative position the members 470 corresponding to the records not to be played. For skipping certain records as noted, the members 342ᵃ of the talking machine corresponding to the skipped records must be moved to inoperative position; this allowing the records to turn past the playing position in the manner already described. The first record and the stereopticon being properly set and the machine started, the first contact of the controller member is made by a finger 292' and at the point of breaking this contact, the magnet 356 causes the stereopticon to move the extent of one slide, this bringing the first picture into displaying position; the other nine contacts are then made successively and the nine pictures displayed. The last picture being displayed, the contact brush 304ᵃ moves along and at about the end of its movement it engages the special contact finger 468, see Fig. 14ᵃ, and the magnet 356 is thus again operated and the slide carrier moved another step. This would normally place the first slide of the second record in display position, but since the member 470 corresponding to the record number two has not been set in slot opening position the slides for record number two will all be held from display. The members 470 as explained not only thus hold the picture slides from moving out to display position, but the rearward extensions 474 thereof by closing the circuit 476 as soon as the advance end of such member reaches the display position, permits the stereopticon slide holder to continue to turn until all the slides so held up are moved past the displaying slot. The rearward extensions 474 of the members 470 are formed so as to cause the stereopticon to be stopped at a point where the last slide is above the displaying slot so that the next move of the stereopticon will bring the first slide of the next record. e. g., record number three into displaying position. For this purpose such rearward extension is cut away at its corner opposite the last slide covered thereby as seen at 477 to an extent about equal to the space of one slide in the stereopticon. Thus when this cut away portion is reached, the circuit to magnet 367ᵃ is opened and the stereopticon comes to a stop with the last slide covered by such member 470 over the displaying slot. By this time the third record is in playing position and the contact brush moves along and engages the first contact of record number three; this operates the magnet 356 which is in another circuit and the arm 357 operates the arm 358, engaging the member 359 to operate the stereopticon when the circuit is broken, the arm 357 being released in the manner already described. Thus records number three and four are played and illustrated in order, and when the last contact of the controller for record number four has been made and the last slide is in displaying position, the contact brush moving along will make contact with the special finger 468 on the controller for record four again operating the magnet 357 as described. This in the manner as already described causes the slides for record number five to be skipped and in like manner record number six will be played. To provide for skipping two records and slides where one record immediately follows the other, I provide means whereby the cut out portion 477 of the member 470 is automatically filled by the positioning of another member 470 adjacent thereto. For this purpose a filler piece 478 is mounted on a spring 479 fixed on the member 470, this spring normally holding said filler piece back out of operative position as seen in Fig. 41. This filler piece has its back formed with a beveled face 480, and each member 470 is formed at its opposite end with a clip piece 481 adapted as said member is swung down to operative position to engage the inclined face 480 of the filler piece on an adjacent member 470, if such member be also down in operative position, thus pressing said filler piece out flush with the rest of the member 470, and continuing the extension 474 to the end of the member 470, thus keeping the circuit 476 closed to continue the turning of the slide holder drum as described to cause the pictures of the two slides in succession to be skipped. It will be understood that in this way a continuous bar extension 474 may be formed to cause any desired plurality of the series of slides corresponding to the several records to be skipped at will. It will be understood that the selected records 9ª to be played and illustrated may be automatically repeated over and over.

It will be understood that in the controller shown in Figs. 18, 21, 25 and 27, it is intended that the operating mechanism for the talking machine reproducer will be of such type that the reproducer will be in exactly the same relation to its operating mechanism at all times during an operation, and that the operative parts of the controllers will be in exactly the same relation to the talking machine reproducer at all times during an operation.

No means has been shown, to shut the light off from the picture screen while the slides in the automatic stereopticon are changing, as this is not new in the art, and can be done in many ways; it needs only be here mentioned that means can be applied to the stereopticon if desired so that the light will be shut off from the screen just before a slide is to be changed and remain cut off from the screen until the next picture slide is in displaying position in the stereopticon, then the light will be allowed to fall on the screen and a new picture will there appear.

The opposite result may also be obtained if desired, wherein the light is not shut off from the screen, even at times when the stereopticon is moving through a portion in which there are slides to be skipped; the light on the curtain might be desired as a means of indicating that more pictures were to be shown.

I am aware that the invention as to its several features may be embodied in other specific forms without departing from the essential attributes thereof and also that certain of said features may be advantageously used apart from others. I therefore desire the present embodiment to be considered in all respects as illustrative and not restrictive referring to the appended claims rather than to the foregoing description to indicate the scope of the invention.

Having described my invention, what I claim as new and desire to secure by Letters Patent is:

1. Apparatus of the kind described, comprising mechanism for presenting in automatic succession the contents of a plurality of talking machine records, mechanism for projecting in automatic succession a series of pictures to illustrate such records, said mechanisms being adapted for continuous repeated operation, and controlling means operated by one of said mechanisms for governing the other of said mechanisms so that it operates in timed relation to the first named mechanism.

2. Apparatus of the kind described, comprising a talking machine equipped with mechanism for presenting in automatic succession the contents of a plurality of records, mechanism for projecting in automatic succession a series of pictures to illustrate such records, said mechanisms being adapted for continuous repeated operation, and controlling means operated by said talking machine for governing the presentation of pictures by said picture projecting mechanism.

3. Apparatus of the kind described, comprising a talking machine formed and adapted to present in automatic succession the contents of a plurality of records, a picture projecting machine formed and adapted to present a plurality of slides in automatic succession to illustrate such records, said mechanisms being adapted for continuous repeated operation, and a series of controller members each corresponding to a record of said talking machine and connected to be actuated by said talking machine adapted to govern the presentation of pictures by said picture projecting means to cause the pictures to be presented in timed relation to the operation of the talking machine.

4. Apparatus of the kind described, comprising a talking machine equipped with mechanism for presenting in automatic succession the contents of a plurality of records, mechanism for projecting in automatic succession a series of pictures to illustrate said records, said mechanisms being adapted for continuous repeated operation, a controller mechanism connected to be actuated with said talking machine and an electric circuit under the control of said controller arranged to govern the operation of said picture projecting mechanism.

5. Apparatus of the kind described, comprising a talking machine equipped with mechanism for presenting in automatic succession the contents of a plurality of records variable as to number, mechanism for projecting in automatic succession a series of pictures to illustrate such records also variable as to number, a controller mechanism connected to be actuated by said talking machine with elements selectively variable according to the records and pictures being handled, and means governed by said controller mechanism for controlling the operation of said picture projecting mechanism.

6. Apparatus of the kind described, comprising a talking machine equipped with mechanism for presenting in automatic succession the contents of a plurality of records variable as to number, and for automatically repeating such presentation, mechanism for projecting in automatic succession a series of pictures to illustrate such records, and a controller mechanism which is adjustable for causing said talking machine and said picture projecting mechanism to operate in timed relation.

7. Apparatus of the kind described, comprising a talking machine equipped with mechanism for presenting in automatic succession the contents of a plurality of records having provision for automatic repeating when either fully or partly loaded with records at will, mechanism for projecting in automatic succession a series of pictures to illustrate such records, adapted to hold either a full complement or a lesser number, and controller mechanism arranged to cause said talking machine and said picture projecting mechanism to operate in timed relation for an indefinite period.

8. Apparatus of the kind described, comprising a talking machine equipped with mechanism for presenting in automatic succession the contents of a series of records, a reproducer carriage mounted and movable to engage the respective records, a picture projecting machine adapted to handle a series of pictures, a controller operated by said talking machine for governing the operation of said picture projecting machine, and a brush carrier coöperative with said controller connected to be moved by the operation of said reproducer carriage with a multiplied movement.

9. Apparatus of the kind described, comprising a multiple record talking machine adapted for repeated operation, a multiple picture slide stereopticon, and controller mechanism constructed and arranged to cause said stereopticon to operate in timed relation to said talking machine for the automatic and repeated presentation of a series of talking machine records and picture slides.

10. Apparatus of the kind described, comprising a multiple record talking machine, a multiple picture slide stereopticon, controller mechanism constructed and arranged to cause said stereopticon to operate in timed relation to said talking machine for the automatic presentation of a series of talking machine records and picture slides, and means associated with said controller mechanism for causing the presentation of said series of records and picture slides to be repeated automatically, at will.

11. Apparatus of the kind described, comprising a multiple record talking machine adapted to present in automatic succession the contents of a series of records, a multiple picture slide stereopticon, controller mechanism constructed and arranged to cause said stereopticon to operate in timed relation to said talking machine for the automatic presentation of a series of talking machine records and picture slides, and means associated with said controller mechanism for causing the presentation of said series of records and picture slides to be repeated automatically, at will.

12. Apparatus of the kind described, comprising a multiple record talking machine, a multiple picture slide stereopticon, and controller mechanism for causing said stereopticon to display a series of pictures in timed relation to the operation of said talking machine, said controller mechanism having operating connections for moving the same in timed relation with the talking machine reproducer carriage but at a relatively accelerated rate.

13. Apparatus of the kind described, comprising a multiple record talking machine, a multiple picture slide stereopticon, and controller mechanism for causing said stereopticon to display a series of pictures in timed relation to the operation of said talking machine, said controller mechanism having speed-up connection to the talking machine reproducer carriage for moving it at a higher rate than said carriage.

14. Apparatus of the kind described, comprising a multiple record talking machine, a multiple picture slide stereopticon, controller mechanism for causing said stereopticon to display a series of pictures in timed relation to the operation of said talking machine, and means admitting of the automatic playing of several records, selected from the group in the talking machine and illustrating the same.

15. Apparatus of the kind described, comprising a multiple record talking machine, a multiple picture slide stereopticon, controller mechanism for causing said stereopticon to exhibit pictures in timed relation with the operation of the talking machine to illustrate the successive records thereof, and means for causing automatic repetition of the production of a series of records and pictures to illustrate the same, said means having associated therewith mechanism permitting such repeated operation with the apparatus either wholly or partly filled with records and picture slides, at will.

16. Apparatus of the kind described, comprising a multiple record talking machine, a multiple picture slide stereopticon, controller mechanism for governing the operation of said stereopticon to cause it to display series of pictures in timed relation to the presentation of the contents of the several records in said talking machine, means for causing the automatic repetition of said talking machine, and said stereopticon, and means for rendering said stereopticon manually operable, and manually operating the same at will.

17. Apparatus of the kind described, comprising mechanism for the automatic presentation of the contents of a plurality of talking machine records, mechanism for the automatic successive presentation of a series of pictures to illustrate such records, and controlling means adapted to cause the synchronous and repeated operation of said mechanisms.

In testimony whereof, I have signed my name to this specification, in the presence of two subscribing witnesses.

JOHN L. BOYLE.

Witnesses:
B. J. NOYES,
H. B. DAVIS.